United States Patent
Kim

(10) Patent No.: US 10,928,871 B2
(45) Date of Patent: Feb. 23, 2021

(54) COMPUTING DEVICE AND OPERATION METHOD THEREOF

(71) Applicant: SK hynix Inc., Icheon (KR)

(72) Inventor: Hyungsup Kim, Yongin (KR)

(73) Assignee: SK hynix Inc., Icheon (KR)

( * ) Notice: Subject to any disclaimer, the term of this patent is extended or adjusted under 35 U.S.C. 154(b) by 48 days.

(21) Appl. No.: 16/039,220

(22) Filed: Jul. 18, 2018

(65) Prior Publication Data

US 2019/0129483 A1    May 2, 2019

(30) Foreign Application Priority Data

Oct. 31, 2017    (KR) .................... 10-2017-0143428

(51) Int. Cl.
*G06F 1/26*    (2006.01)
*G06F 12/02*    (2006.01)
*G06F 3/06*    (2006.01)

(52) U.S. Cl.
CPC ............. *G06F 1/26* (2013.01); *G06F 3/0604* (2013.01); *G06F 3/067* (2013.01); *G06F 3/0635* (2013.01); *G06F 3/0653* (2013.01); *G06F 3/0673* (2013.01); *G06F 12/0215* (2013.01)

(58) Field of Classification Search
CPC .......... G06F 1/26; G06F 3/0635; G06F 3/067; G06F 3/0653; G06F 3/0673; G06F 12/0215; G06F 3/0604
See application file for complete search history.

(56) References Cited

U.S. PATENT DOCUMENTS

| | | | |
|---|---|---|---|
| 7,065,624 B1 | 6/2006 | Zahavi | |
| 7,085,904 B2 | 8/2006 | Mizuno et al. | |
| 8,037,267 B2 * | 10/2011 | Jinno | G06F 1/3221 711/162 |
| 8,645,610 B2 * | 2/2014 | Chang | G06F 12/1009 711/202 |
| 8,775,988 B2 * | 7/2014 | Lavin | G06F 30/3323 716/108 |
| 8,839,032 B2 | 9/2014 | Walton et al. | |
| 8,954,698 B2 * | 2/2015 | Schenfeld | G06F 12/0292 711/147 |
| 8,954,701 B2 * | 2/2015 | Schenfeld | G06F 12/0292 711/147 |

(Continued)

FOREIGN PATENT DOCUMENTS

KR    10-2005-0033060 A    4/2005
KR    1020140078390 A    6/2014

(Continued)

OTHER PUBLICATIONS

"DDR5 Full Spec Draft Rev0.5g," Comittee Letter Ballot, Aug. 11, 2011, 289 pages, JEDEC, Arlington, Virginia.

(Continued)

*Primary Examiner* — Christopher D Birkhimer

(57) ABSTRACT

A computing device includes: a plurality of memory blades; and a memory blade management unit suitable for controlling each of the plurality of memory blades based on a global map including information of each of the plurality of memory blades, wherein each of the plurality of memory blades includes: a plurality of memory devices; and a controller suitable for detecting a status of each of the plurality of memory devices.

17 Claims, 14 Drawing Sheets

(56) References Cited

U.S. PATENT DOCUMENTS

| | | | |
|---|---|---|---|
| 9,104,586 B2* | 8/2015 | Schenfeld | G06F 12/0292 |
| 9,104,587 B2* | 8/2015 | Schenfeld | G06F 12/0292 |
| 9,110,818 B2* | 8/2015 | Schenfeld | G06F 12/0292 |
| 9,128,662 B2* | 9/2015 | Kim | G06F 1/1658 |
| 9,152,332 B2* | 10/2015 | Kopylovitz | G06F 12/0866 |
| 9,159,374 B2* | 10/2015 | Kim | G11C 5/04 |
| 9,256,547 B2* | 2/2016 | Schenfeld | G06F 12/0292 |
| 9,390,047 B2* | 7/2016 | Schenfeld | G06F 12/0292 |
| 9,396,026 B2 | 7/2016 | Ichikawa et al. | |
| 9,442,854 B2 | 9/2016 | Hyde et al. | |
| 9,535,606 B2 | 1/2017 | Krithivas et al. | |
| 2004/0054776 A1 | 3/2004 | Klotz et al. | |
| 2006/0259621 A1 | 11/2006 | Ranganathan et al. | |
| 2008/0222348 A1 | 9/2008 | Mosek | |
| 2008/0309349 A1 | 12/2008 | Sutono | |
| 2009/0037164 A1 | 2/2009 | Gaither et al. | |
| 2009/0249018 A1 | 10/2009 | Nojima et al. | |
| 2009/0276567 A1 | 11/2009 | Burkey | |
| 2010/0228956 A1 | 9/2010 | Sakamaki | |
| 2011/0041005 A1 | 2/2011 | Selinger | |
| 2011/0231743 A1 | 9/2011 | Sakamaki | |
| 2012/0005556 A1* | 1/2012 | Chang | G06F 12/1009 714/758 |
| 2012/0179823 A1 | 7/2012 | Hatasaki et al. | |
| 2013/0107443 A1* | 5/2013 | Kim | G11C 5/04 361/679.32 |
| 2013/0163175 A1* | 6/2013 | Kim | G06F 1/1658 361/679.32 |
| 2013/0275703 A1* | 10/2013 | Schenfeld | G06F 12/0292 711/165 |
| 2013/0275704 A1* | 10/2013 | Schenfeld | G06F 12/0292 711/165 |
| 2013/0275705 A1* | 10/2013 | Schenfeld | G06F 12/0292 711/165 |
| 2013/0275706 A1* | 10/2013 | Schenfeld | G06F 12/0292 711/165 |
| 2013/0275707 A1* | 10/2013 | Schenfeld | G06F 12/0292 711/165 |
| 2014/0006898 A1 | 1/2014 | Sharon et al. | |
| 2015/0106564 A1* | 4/2015 | Kopylovitz | G06F 12/0866 711/114 |
| 2015/0188649 A1 | 7/2015 | Buckler et al. | |
| 2015/0254108 A1 | 9/2015 | Kurtzman et al. | |
| 2015/0370697 A1* | 12/2015 | Schenfeld | G06F 12/0292 711/202 |
| 2016/0154755 A1* | 6/2016 | Schenfeld | G06F 12/0292 711/135 |
| 2018/0260158 A1 | 9/2018 | Marripudi et al. | |

FOREIGN PATENT DOCUMENTS

| | | |
|---|---|---|
| KR | 1020160022242 A | 2/2016 |
| KR | 1020160072890 A | 6/2016 |
| KR | 1020160144560 A | 12/2016 |
| KR | 1020170066083 A | 6/2017 |

OTHER PUBLICATIONS

"Gen-Z Core Specification," Gen-Z Consortium, 2016-2018, Version 1.0, 983 pages.

Office Action dated May 26, 2020 for U.S. Appl. No. 16/189,984.

Office Action dated Aug. 21, 2020 for U.S. Appl. No. 16/041,258.

Office Action dated Dec. 31, 2019 for U.S. Appl. No. 16/041,258.

* cited by examiner

COMPUTING DEVICE AND OPERATION METHOD THEREOF

CROSS-REFERENCE TO RELATED APPLICATIONS

The present application claims priority to Korean Patent Application No. 10-2017-0143428, filed on Oct. 31, 2017, which is incorporated by reference herein in its entirety.

BACKGROUND

1. Field

Various embodiments of the present disclosure relate to a computing device and a method for operating the computing device.

2. Description of the Related Art

Data are becoming important assets in the fourth industrial revolution, and the demands for new technology in support of transferring and analyzing large-scale data at a high data rate are increasing. For example, as artificial intelligence, autonomous driving, robotics, health care, virtual reality (VR), augmented reality (AR), and smart home technologies spread, demands for servers or data centers are increasing.

A legacy data center includes resources for computing, networking, and storing data, in the same equipment. However, a future large-scale data center may construct resources individually and then logically restructure the resources. For example, in the large-scale data center, the resources may be modularized at the level of racks, and the modularized resources may be restructured and supplied according to the usage. Therefore, a converged storage or memory device, which can be used for the future large-scale data center, is demanded.

SUMMARY

Embodiments of the present disclosure are directed to a computing device capable of detecting a defective memory device and efficiently recovering the defective memory device, and an operation method thereof.

In accordance with an embodiment of the present invention, a computing device includes: a plurality of memory blades; and a memory blade management unit to control each of the plurality of memory blades based on a global map that includes information on each of the plurality of memory blades, wherein each of the plurality of memory blades includes: a plurality of memory devices; and a controller to control the plurality of memory devices, wherein the controller includes: a monitor to periodically check a status of each of the plurality of memory devices; a power management unit to provide a power to each of the plurality of memory devices and a power to each of elements included in the controller; a node controller to receive a request provided from other memory blades; and an address router to determine a target memory device for the request among the plurality of memory devices based on meta information of data for the request.

In accordance with an embodiment of the present invention, a computing device includes: a memory blade including: a plurality of memory devices including a spare memory device; and a controller, wherein the controller includes: a monitor to periodically check a status of each of the plurality of memory devices; a power management unit to provide a power to each of the plurality of memory devices and a power to each of elements included in the controller; a node controller to receive a request provided from other memory blades; and an address router to determine a target memory device for the request among the plurality of memory devices based on meta information of data for the request.

In accordance with an embodiment of the present invention, a method for operating a computing device including a plurality of memory blades and a memory blade management unit, a method includes: periodically detecting a status of each of a plurality of memory devices in each of the plurality of memory blades; when a defective memory device is detected among a plurality of memory devices in a target memory blade, performing steps of: forwarding location information of the defective memory device to the memory blade management unit; powering on a slot of a spare memory device in the target memory blade; and performing a backup operation of copying data from the defective memory device into the spare memory device.

In accordance with an embodiment of the present invention, a method for operating a computing device including a plurality of memory blades and a memory blade management unit, a method includes: providing a request generated by a first memory blade to the memory blade management; forwarding, by the memory blade management unit, the request provided from the first memory blade to a second memory blade based on a global map that includes information on each of the plurality of memory blades; and determining a target memory device for the request among a plurality of memory devices in the second memory blade based on meta information of data for the request.

DETAILED DESCRIPTION

Figure 1:
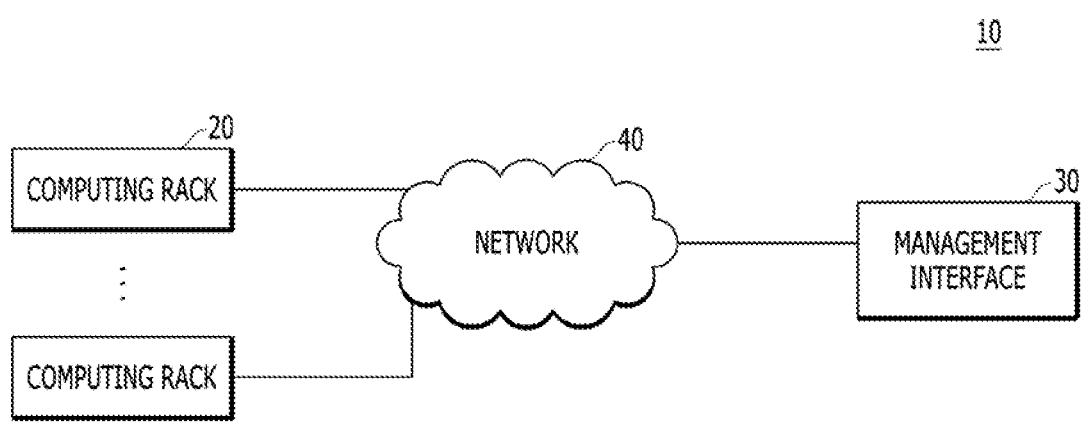
FIG. 1 is a block diagram illustrating a data processing system.

Exemplary embodiments of the present disclosure will be described below in more detail with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Throughout the disclosure, like reference numerals refer to like parts throughout the various figures and embodiments of the present disclosure.

FIG. 1 is a block diagram illustrating a data processing system 10. Referring to FIG. 1, the data processing system 10 may include a plurality of computing racks 20, a management interface 30, and a network 40 for communication between the computing racks 20 and the management interface 30. The data processing system 10 having this rack-scale architecture may be used by a data center for processing large-scale data.

Each of the computing racks 20 may individually implement one computing device. Alternatively, each of the computing racks 20 may be combined with other computing racks to implement one computing device. The specific structures and operations of the computing racks 20 will be described later on.

The management interface 30 may provide an interactive interface for a user to control, administrate, or manage the data processing system 10. The management interface 30 may be realized using an arbitrary type of a computing device that includes any of a computer, a multi-processor system, a server, a rack-mount server, a blade server, a lap-top computer, a notebook computer, a tablet computer, a wearable computing device, a network device, a web device, a distributed computing system, a processor-based system, a consumer electronic device, and so on.

According to some embodiments of the present disclosure, the management interface 30 may be realized by a distributed system having operation functions which may be performed by the computing racks 20 or having user interface functions which may be performed by the management interface 30. According to other embodiments of the present disclosure, the management interface 30 may be realized by a virtual cloud server that includes multi-computing devices distributed through the network 40. The management interface 30 may include a processor, an input/output subsystem, a memory, a data storage device, and a communication circuit.

The network 40 may transfer/receive data between the computing racks 20 and the management interface 30 and/or between the computing racks 20. The network 40 may be realized by an appropriate number of various wired and/or wireless networks. For example, the network 40 may include a publicly accessible global network, such as a wired or wireless Local Area Network (LAN), a Wide Area Network (WAN), a cellular network, and/or the Internet. In addition, the network 40 may include an appropriate number of auxiliary network devices, such as auxiliary computers, routers, and switches.

Figure 2:
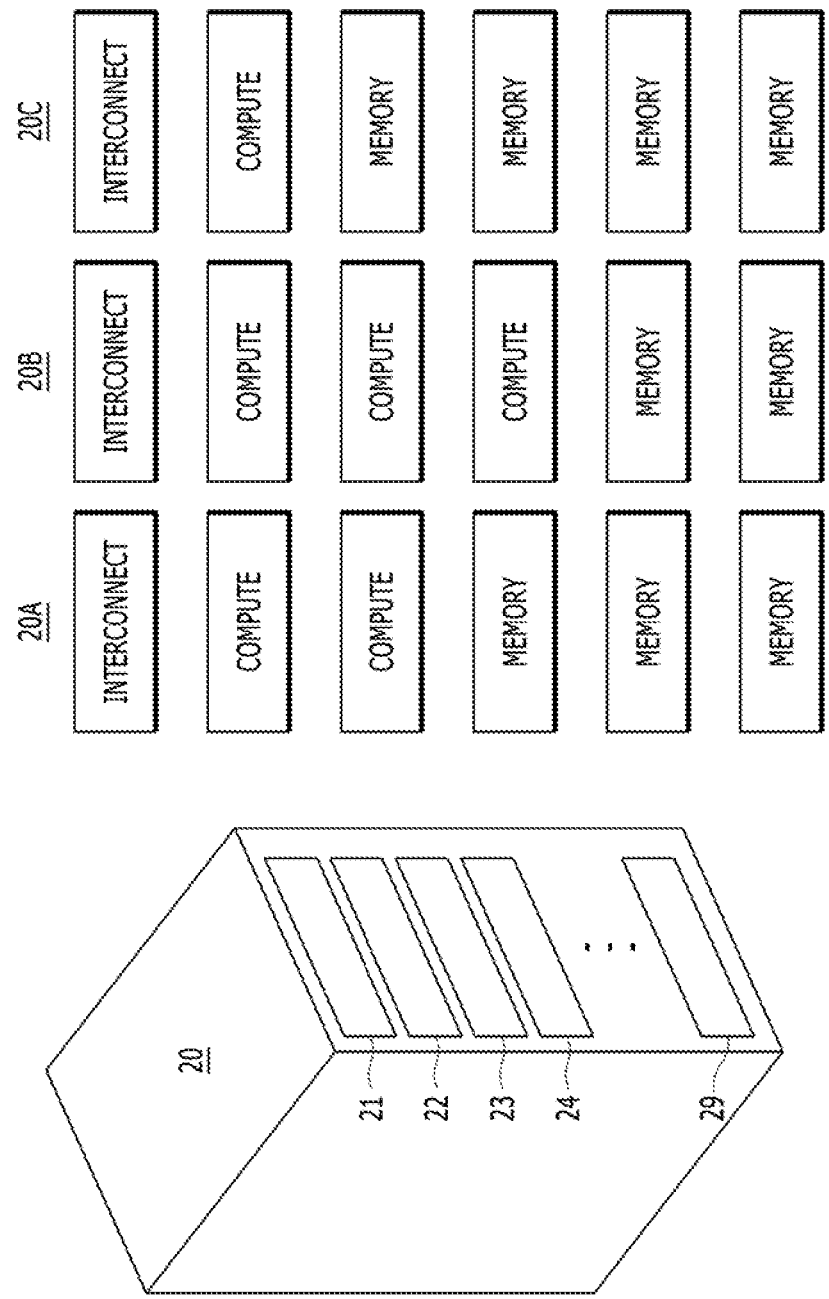
FIGS. 2 and 3 illustrate a computing device in accordance with an embodiment of the present disclosure.

FIG. 2 illustrates a computing device having a rack structure in accordance with an embodiment of the present disclosure.

Referring to FIG. 2, the computing rack 20 may include constituent elements in various forms, and structures, shapes, and names of the constituent elements are not limited. For example, the computing rack 20 may include a plurality of drawers 21 to 29. Each of the drawers 21 to 29 may include a plurality of modules, each of which may include a plurality of blades.

In various embodiments of the present disclosure, the computing rack 20 may be realized by a combination of appropriate numbers of computer blades, memory blades, and/or interconnect blades. Herein, it is defined that the computing rack 20 is realized by a combination of a plurality of blades, but the computing rack 20 may also be realized by diversely named element such as drawers, modules, trays, boards, sashes, or units. The computing rack 20 may have a structure where the constituent elements of the computing rack 20 are disaggregated and classified according to their functions for the sake of convenience in realization. Although not limited, the computing rack 20 may have a structure of an interconnect blade, a compute blade, and a memory blade a classification order from the top. The computing rack 20 and a computing device including the computing rack 20 may be referred to as 'a rack-scale system' or 'a disaggregated system.'

In an embodiment of the present disclosure, a computing device may be realized by one computing rack 20. In other embodiments, the computing device may be realized by all constituent elements of two or more computing racks 20, realized by some of constituent elements of two or more computing racks 20, or some of constituent elements of one computing rack 20.

In various embodiments of the present disclosure, a computing device may be realized by a combination of appropriate numbers of compute blades, memory blades, and interconnect blades that are included in the computing rack 20. As illustrated in FIG. 2, a computing rack 20A may include two compute blades, three memory blades, and one interconnect blade. In another example, a computing rack 20B may include three compute blades, two memory blades, and one interconnect blade. In still another example, a computing rack 20C may include one compute blade, four memory blades, and one interconnect blade.

Although FIG. 2 illustrates a case where the computing rack 20 includes appropriate numbers of compute blades, memory blades, and interconnect blades, the computing rack 20 may include additional constituent elements that may be included in typical servers, such as a power system, a cooling system, an input/output device, and so on.

Figure 3:
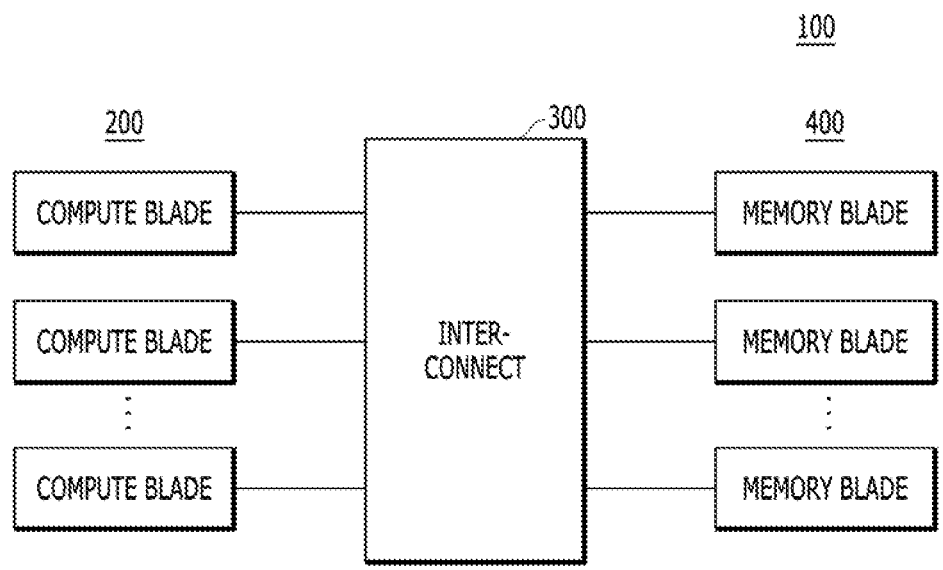

FIG. 3 illustrates a computing device 100 in accordance with an embodiment of the present disclosure.

Referring to FIG. 3, the computing device 100 may include a plurality of compute blades 200, a plurality of memory blades 400, and an interconnect blade 300. The compute blades 200 may be called pooled compute blades or pooled compute systems. Similarly, the memory blades may be called pooled memory blades or pooled memory systems. Herein, it is defined that the computing device 100 is realized by a combination of a plurality of blades, but the computing device 100 may also be realized by diversely named elements such as drawers, modules, trays, boards, sashes, or units.

Each of the compute blades 200 may include one or more of processing elements such as a processor, a processing/control circuit, a Central Processing Unit (CPU), and so on.

Each of the memory blades 400 may include one or more memories, such as volatile memories, non-volatile memories, or a combination thereof. For example, each of the memory blades 400 may include Dynamic Random Access Memories (DRAMs), flash memories, memory cards, hard disk drives (HDDs), solid state drives (SSDs), or a combination thereof.

Each of the memory blades 400 may be divided, allocated, or designated by and used by one or more processing elements that are included in each of the compute blades 200. Also, each of the memory blades 400 may store one or more operating systems (OS) that may be initialized and/or executed by the compute blades 200.

The interconnect blade 300 may include a communication circuit, a communication device, or a combination thereof, which may be divided, allocated, or designated by and used by one or more processing elements included in each of the compute blades 200. For example, the interconnect blade 300 may be realized by an arbitrary number of network interface ports, interface cards, or interface switches. The interconnect blade 300 may use protocols related to one or more wired communication technologies for communication. For example, the interconnect blade 300 may support communication between the compute blades 200 and the memory blades 400 based on one or more of protocols such as PCIe (Peripheral Component Interconnect Express), QPI (QuickPath Interconnect), Ethernet, and the like.

Figure 4:
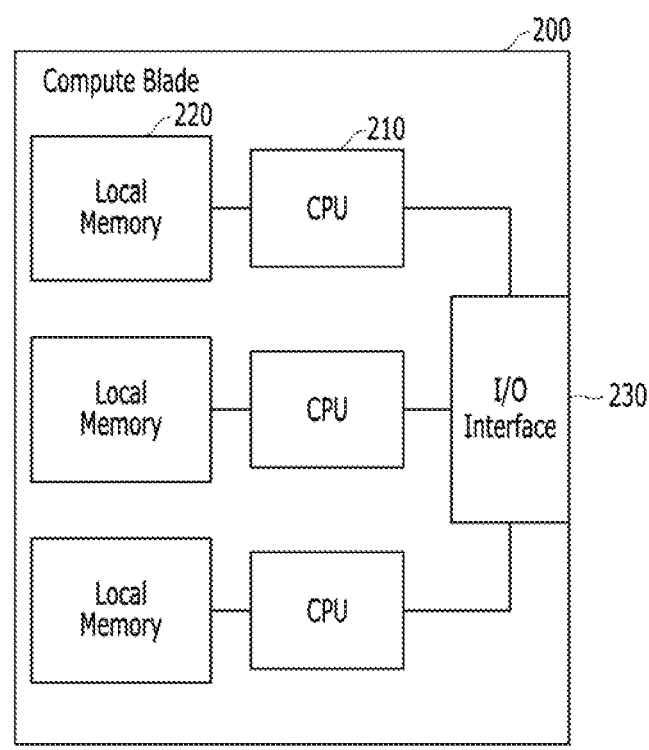
FIG. 4 is a block diagram illustrating a computer blade in accordance with an embodiment of the present disclosure.

FIG. 4 is a block diagram illustrating a compute blade 200 in accordance with an embodiment of the present disclosure.

Referring to FIG. 4, the compute blades 200 may include one or more Central Processing Units (CPUs) 210, one or more local memories 220, and an input/output (I/O) interface 230.

The CPUs 210 may divide, allocate, or designate one or more memory blades to be used, among the memory blades 400 illustrated in FIG. 3. Also, the CPUs 210 may initialize the one or more memory blades, and perform a data read operation and/or a data write (i.e., program) operation on the one or more memory blades.

The local memories 220 may store data to perform an operation of the CPUs 210. In various embodiments of the present disclosure, the local memories 220 may be a one-to-on correspondence with the CPUs 210.

The input/output interface 230 may support interfacing between the CPUs 210 and the memory blades 400 through the interconnect blade 300 of FIG. 3. The input/output interface 230 may use protocols related to one or more wired communication technologies, output and transfer data from the CPUs 210 to the interconnect blade 300, and receive data inputted from the interconnect blade 300 to the CPUs 210. For example, the input/output interface 230 may support communication between the CPUs 210 and the interconnect blade 300 using one or more of protocols such as PCIe (Peripheral Component Interconnect Express), QPI (QuickPath Interconnect), Ethernet and the like.

Figure 5:
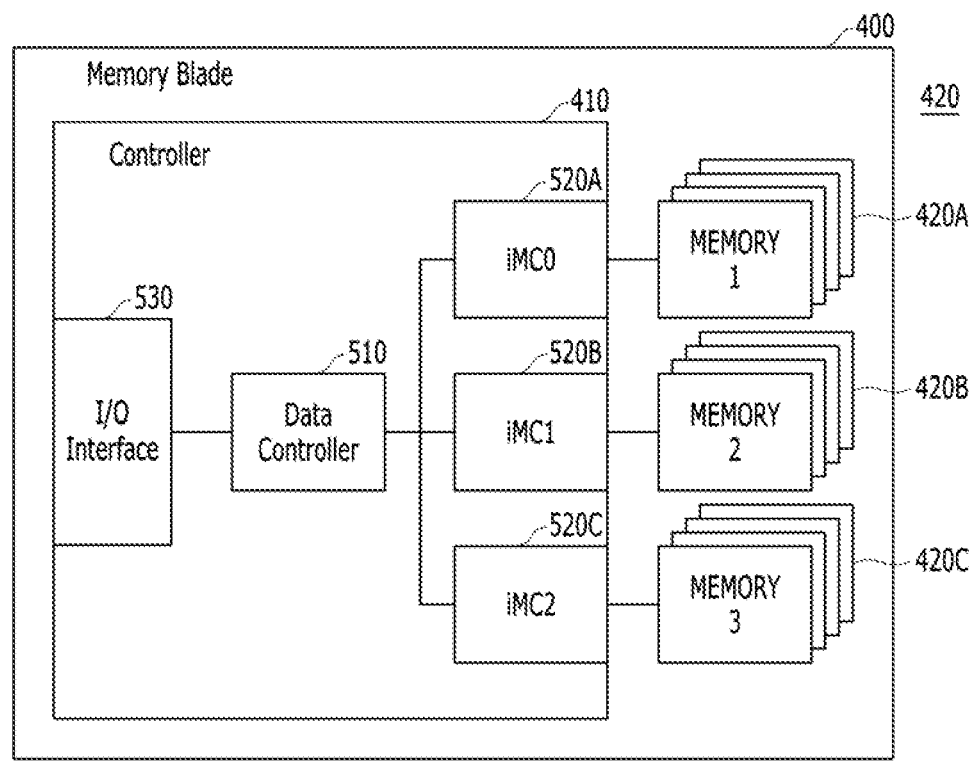
FIG. 5 is block diagrams illustrating a memory blade in accordance with an embodiment of the present disclosure.

FIG. 5 is a block diagram illustrating a memory blade 400 in accordance with an embodiment of the present disclosure.

Referring to FIG. 5, the memory blade 400 may include a controller 410 and a plurality of memories 420. The memories 420 may store (or write) data therein and output (or read) stored data under the control of the controller 410. The memories 420 may include a first memory group 420A, a second memory group 420B, and a third memory group 420C. Each of the first, second, and third memory groups 420A, 420B, and 420C may include a multiplicity of memories. The first memory group 420A, the second memory group 420B, and the third memory group 420C may have the same characteristics or different characteristics. According to various embodiments of the present disclosure, the first memory group 420A, the second memory group 420B, and the third memory group 420C may include memories having the same characteristics or memories having different characteristics, in terms of capacity or latency.

Referring back to FIG. 5, the controller 410 may include a data controller 510, memory controllers (MC) 520A to 520C, and an input/output (I/O) interface 530.

The data controller 510 may control data transferred and received between the memories 420 and the compute blades 200 of FIG. 3. For example, in response to a write request or command, the data controller 510 may receive write data from the compute blades 200 and control a write operation for writing the write data in a corresponding memory among the memories 420. In a read operation, in response to a read request or command, the data controller 510 may read out data stored in a particular memory among the memories 420 and control the read operation for outputting the read data to a corresponding compute blade among the compute blades 200.

The memory controllers 520A to 520C may be disposed between the data controller 510 and the memories 420, and may support interfacing between the data controller 510 and the memories 420. The memory controllers 520A to 520C may include a first memory controller (iMC0) 520A, a second memory controller (iMC1) 520B, and a third memory controller (iMC2) 520C that respectively correspond to the first memory group 420A, the second memory group 420B, and the third memory group 420C included in the memories 420. The first memory controller (iMC0) 520A may be disposed between the data controller 510 and the first memory group 420A, and may support data transfer/reception between the data controller 510 and the first memory group 420A. The second memory controller (iMC1) 520B may be disposed between the data controller 510 and the second memory group 420B, and may support data transfer/reception between the data controller 510 and the second memory group 420B. The third memory controller (iMC2) 520C may be disposed between the data controller 510 and the third memory group 420C, and may support data transfer/reception between the data controller 510 and the third memory group 420C. Although an example where the controller 410 includes three memory controllers, i.e., the first memory controller (iMC0) 520A, the second memory controller (iMC1) 520B, and the third memory controller (iMC2) 520C, is described herein, when the first memory group 420A, the second memory group 420B, and the third memory group 420C include DRAMs, the controller 410 may include a single memory controller.

The input/output interface 530 may support interfacing between the data controller 510 and the compute blades 200 through the interconnect blade 300 of FIG. 3. The input/output interface 530 may use one or more protocols related to wired communication technologies, transfer read data from the data controller 510 to the interconnect blade 300, and transfer write data from the interconnect blade 300 to the data controller 510. For example, the input/output interface 530 may support communication between the data controller 510 and the interconnect blade 300 based on one or more of protocols such as Peripheral Component Interconnect Express (PCIe), QuickPath Interconnect (QPI), Ethernet, and the like.

Hereinafter, a computing device including a plurality of memory blades will be described.

Typically, a system-on-chip (SoC) unit integrates a plurality of components of an electronic system in a single chip. For example, a digital function, an analog function, a mixed signal function, and sometimes a wireless frequency function are all included in a single chip. A memory blade may be implemented with a combination of such SoC units and various memories. When necessary functions are integrated in a single SoC unit, a memory blade may be implemented with the single SoC unit. A plurality of memory blades may communicate with one another for storage and processing of a massive amount of data such as "big data".

Therefore, efficient data processing between memory blades coupled to each other should be secured for system stability. Under a situation where information is shared by a plurality of memory blades coupled to each other, technology for ensuring data integrity among the plurality of memory blades is demanded when one or more of the plurality of memory blades are not capable of performing normal operations due to various reasons such as a system failure, a sudden power off, and so forth.

Figure 6:
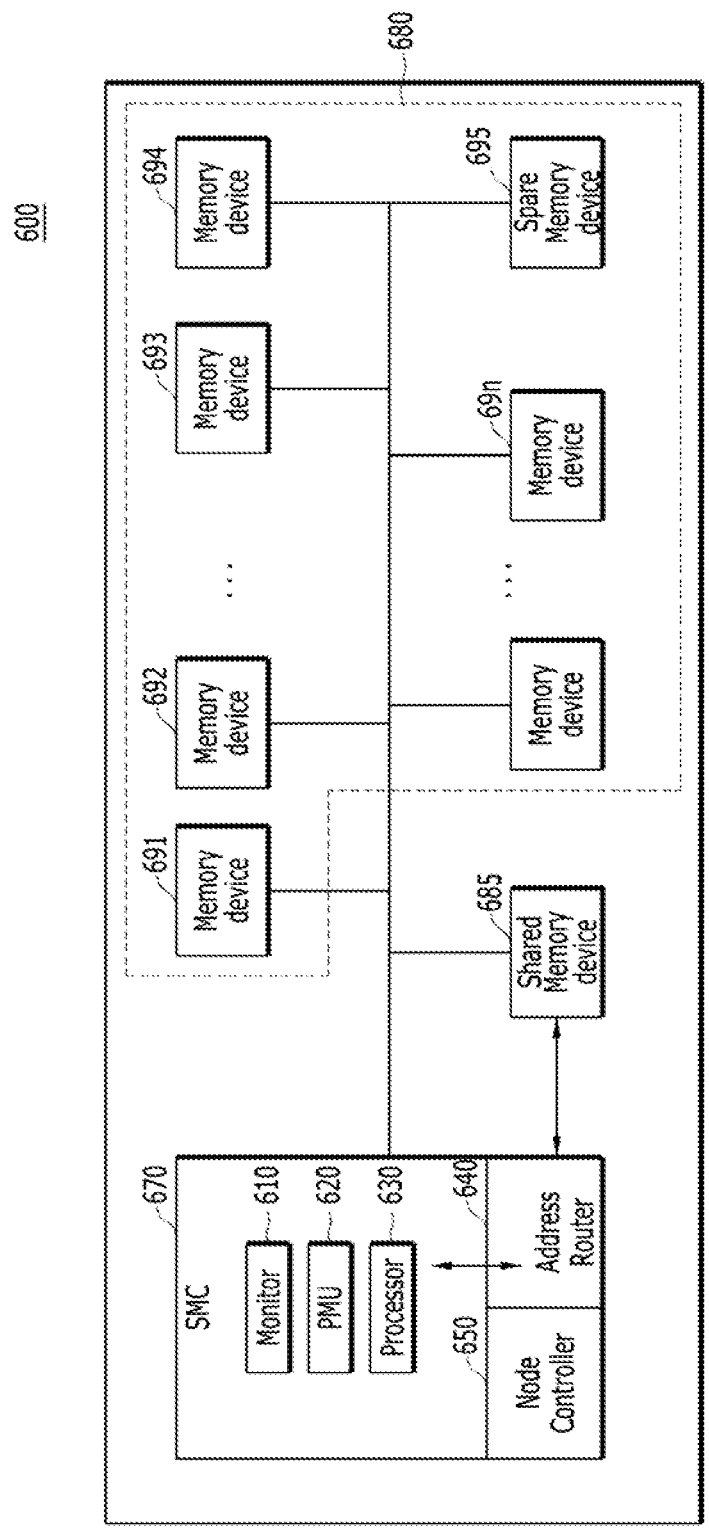
FIG. 6 is a diagram schematically illustrating a memory blade in accordance with an embodiment of the present disclosure.

FIG. 6 is a diagram schematically illustrating a memory blade 600 in accordance with an embodiment of the present disclosure.

Referring to FIGS. 5 and 6, the memory blade 600 may correspond to the memory blade 400 described with reference to FIG. 5. The memory blade 600 may include a controller 670 and a local memory device unit 680. The local memory device unit 680 may include a plurality of memory devices 691 to 69N mounted on a plurality of dual in-line memory module (DIMM) slots. The controller 670 may correspond to the controller 410 described with reference to FIG. 5. Each of the plurality of memory devices 691 to 69N may correspond to the memory 420 described with reference to FIG. 5.

The memory blade 600 may further include one or more shared memory devices 685. Life cycles of the plurality of memory devices 691 to 69N may be different from one another. An error may independently occur in an individual one among the plurality of memory devices 691 to 69N. Therefore, each of the plurality of memory devices 691 to 69N may be required to independently correct an error occurring therein. For example, an individual memory device where an error occurs, among the plurality of memory devices 691 to 69N, may be replaced with a new memory device. Further, in accordance with an embodiment of the present disclosure, the memory blade 600 may further include spare memory devices 695 at one or more DIMM slots. Although not illustrated, the spare memory devices 695 may include one or more memory devices.

The shared memory devices 685 of the memory blade 600 may store data, which another memory blade read-requests or write-requests. For example, when a first memory blade sends a read request to a second memory blade, e.g., the memory blade 600, if the second memory blade 600 stores location information of data corresponding to the read request in the plurality of memory devices 691 to 69N, the controller 670 of the second memory blade 600 may control the plurality of memory devices 691 to 69N to store the data corresponding to the read request in the shared memory devices 685 of the second memory blade 600. Further, the shared memory devices 685 may manage data stored therein through queues. When a number of queues becomes greater than a threshold value, data stored in the shared memory devices 685 may be moved into the local memory device unit 680 including the plurality of memory devices 691 to 69N. The shared memory devices 685 may include a plurality of input/output channels. Therefore, the shared memory devices 685 may communicate with the controller 670 and an address router 640, respectively. The shared memory devices 685 will be described in detail with reference to FIG. 12.

The controller 670 may include a monitor 610, a power management unit (PMU) 620, a processor 630, the address router 640, and a node controller 650.

The monitor 610 may periodically determine whether defects occur in the plurality of memory devices 691 to 69N. In an embodiment, the monitor 610 may check an error occurrence frequency of each of the plurality of memory devices 691 to 69N, and may determine a memory device having the error occurrence frequency that is greater than a first threshold value, as a defective memory device, among the plurality of memory devices 691 to 69N. In another embodiment, the monitor 610 may detect a temperature of each of the plurality of memory devices 691 to 69N, and may determine a memory device having a temperature that is greater than a second threshold value, as a defective memory device, among the plurality of memory devices 691 to 69N.

When a memory device is determined as a defective memory device among the plurality of memory devices 691 to 69N, the monitor 610 may store location information of the defective memory device. Also, the monitor 610 may periodically set flags indicating availabilities of the plurality of memory devices 691 to 69N, and store the set flags in a flag table. The monitor 610 may periodically update the flag table. For example, the flag table may have information indicating availabilities of the spare memory devices 695. In detail, the monitor 610 may identify the availabilities of the spare memory devices 695 by referring to the flag table, and may periodically update the flag table by communicating with the spare memory devices 695. Also, when a plurality of memory devices are determined as defective memory devices, the monitor 610 may set a processing order of backup operations to be performed on the plurality of defective memory devices. The backup operation will be described in detail later.

For example, the monitor 610 may assign the highest priority to a backup operation for a first defective memory device, which has an error occurrence frequency that is greater than the first threshold value, among a plurality of defective memory devices. Also, the monitor 610 may assign a lower priority to a backup operation for a second defective memory device, which has a current that is greater than a third threshold value or has a temperature that is greater than the second threshold value, compared to the first defective memory device, among the plurality of defective memory devices. The plurality of defective memory devices may be queued according to the priorities of the backup operations in order. The monitor 610 may store the priority order of the plurality of defective memory devices for performing the backup operations. The backup operations for the defective memory devices having lower priorities may not be performed until the backup operations for the defective memory devices having higher priorities are complete.

The power management unit 620 may manage power supply to components included in the controller 670. The power management unit 620 may also manage power supply to the plurality of memory devices 691 to 69N. For example, the power management unit 620 may cut off power supply to a DIMM slot of a defective memory device and may allow power supply to DIMM slots of the spare memory devices 695. The power management unit 620 may separately manage power supply to the shared memory devices 685 from power supply to the local memory device unit 680. The power management unit 620 may individually manage power supply to each of the components included in the controller 670. For example, the power management unit 620 may allow power supply to only the address router 640, the node controller 650, and the shared memory devices 685. The independency of the address router 640, the node controller 650, and the shared memory devices 685 may be enhanced because of the independent power supply management by the power management unit 620.

The processor 630 may control the overall operation of the memory blade 600. The processor 630 may control the shared memory devices 685, the local memory device unit 680, and the spare memory devices 695 to perform a backup operation of copying data from a defective memory device into the spare memory devices 695.

The address router 640 and the node controller 650 may be included in the controller 670 as illustrated in FIG. 6. However, in another embodiment, the address router 640 and the node controller 650 may be arranged outside the controller 670 as separate components in the memory blade 600.

The node controller 650 may receive a request provided from another memory blade. In detail, a request provided from another memory blade may be transferred to the node controller 650 through a memory blade management unit, which will be described with reference to FIG. 7.

The address router 640 may determine a location of a memory device based on meta information of data corresponding to the request received by the node controller 650. The address router 640 may change a logical address into a physical address. The meta information may be used to change the logical address into the physical address, and may be stored in the address router 640 or the shared memory devices 685. The meta information will be described later with reference to FIG. 13.

Although not illustrated in FIG. 6, each of the plurality of DIMM slots may have an LED indicator. An LED indicator may indicate a current status of a memory device that is inserted into a corresponding DIMM slot. For example, when an operation of the corresponding memory device is in a normal state, the LED indicator may turn on green light. On the other hand, when the corresponding memory device is in a bad state, for example, when an error occurrence frequency of the corresponding memory device becomes close to the first threshold value, the LED indicator may turn on yellow light. When the corresponding memory device is determined as a defective memory device and thus waiting for a backup operation, the LED indicator may turn on red light.

During a backup operation of copying data from a defective memory device into the spare memory devices 695, an LED indicator of a DIMM slot on which the defective memory device is mounted may flash red light. On the other hand, during the backup operation of copying the data from the defective memory device into the spare memory device 695, an LED indicator of a DIMM slot on which the spare memory device 695 is mounted may flash blue light. When the spare memory device 695 operates instead of the defective memory device, the LED indicator of the DIMM slot on which the spare memory device 695 is mounted may turn on blue light.

Figure 7:
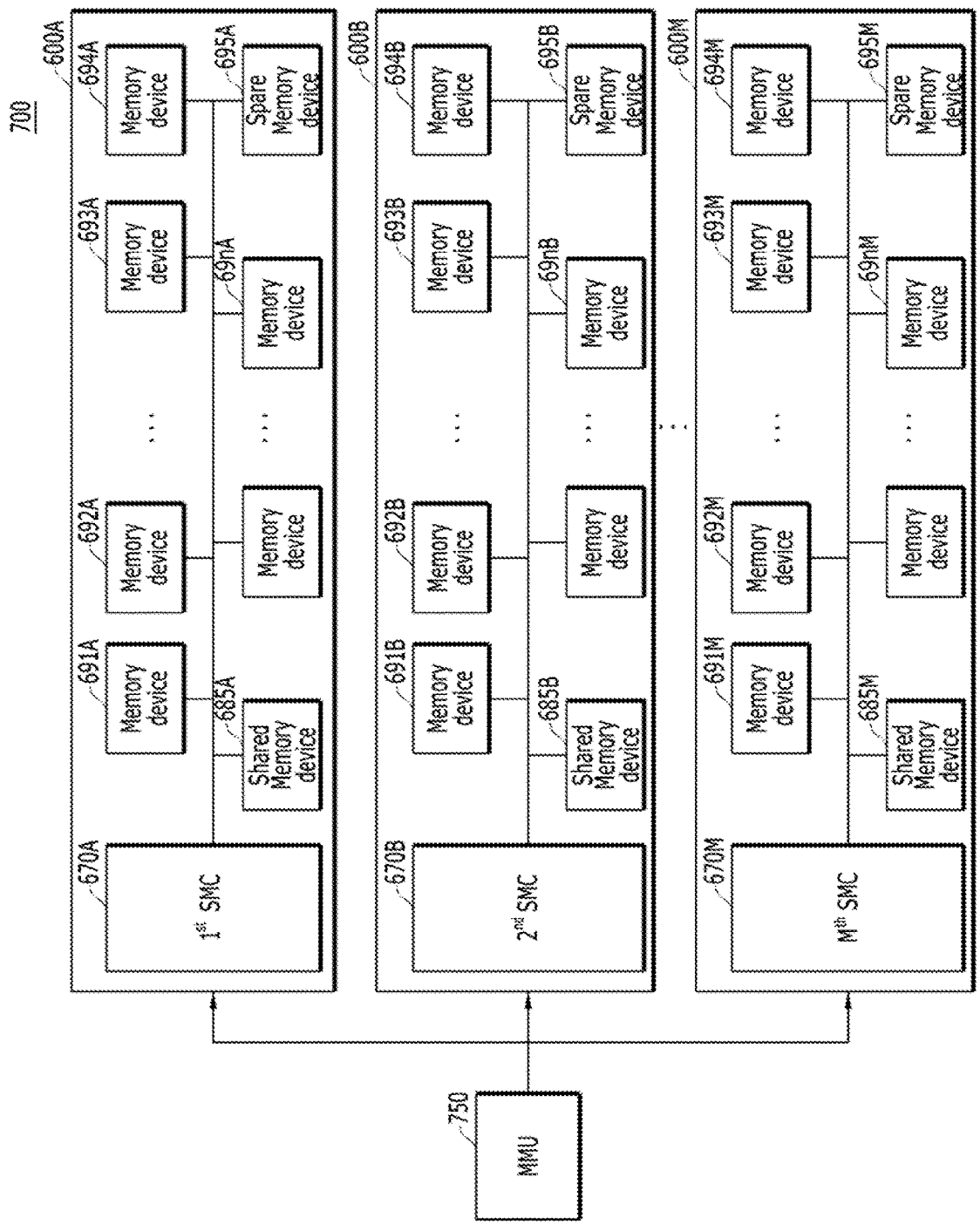
FIG. 7 is a diagram schematically illustrating a computing device in accordance with an embodiment of the present disclosure.

FIG. 7 is a diagram schematically illustrating a computing device 700 in accordance with an embodiment of the present disclosure.

The computing device 700 may include a memory blade management unit (MMU) 750 and a plurality of memory blades 600A to 600M, M being a positive integer. The memory blade management unit 750 may be included in the compute blade 200 described above with reference to FIGS. 3 and 4.

The memory blade management unit 750 may communicate with each of the plurality of memory blades 600A to 600M through the interconnect blade 300 described above with reference to FIG. 3. The memory blade management unit 750 may control each of the plurality of memory blades 600A to 600M. Each of the plurality of memory blades 600A to 600M may correspond to the memory blade 600 shown in FIG. 6. In particular, the memory blade management unit 750 may control each of a plurality of controllers 670A to 670M respectively included in the plurality of memory blades 600A to 600M. Each of the plurality of controllers 670A to 670M may correspond to the controller 670 shown in FIG. 6. Further, the memory blade management unit 750 may store therein a global map storing a flag table of each of the plurality of memory blades 600A to 600M and location information of a plurality of memory devices 691x to 69Nx included in each of the plurality of memory blades 600A to 600M, x being any of A to M. The memory blade management unit 750 may update the global map by periodically communicating with each of the plurality of memory blades 600A to 600M since the plurality of memory blades 600A to 600M may communicate with one another through the memory blade management unit 750.

Referring back to FIG. 6, the node controller 650 of the memory blade 600 may receive a read request or a write request provided from another memory blade. The memory blade management unit 750 shown in FIG. 7 may transfer data corresponding to the read request or the write request. For example, referring to FIGS. 6 and 7, a first node controller included in the first memory blade 600A may perform a data communication with a second node controller included in the second memory blade 600B through the memory blade management unit 750.

When the second memory blade 600B tries to access a target memory device included in the first memory blade 600A, the second memory blade 600B may provide the memory blade management unit 750 with an access request for accessing the first memory blade 600A through the second node controller of the second memory blade 600B. Then, the memory blade management unit 750 may forward the access request to the first node controller of the first memory blade 600A based on the global map. Address information of data corresponding the access request may be forwarded to a first address router included in the first memory blade 600A. The first address router of the first memory blade 600A may locate the target memory device in the first memory blade 600A for the data corresponding to the access request based on meta information of the data corresponding to the access request. An operation of the first memory blade 600A in response to the access request from the second memory blade 600B will be described later with reference to FIG. 12.

Figure 8:
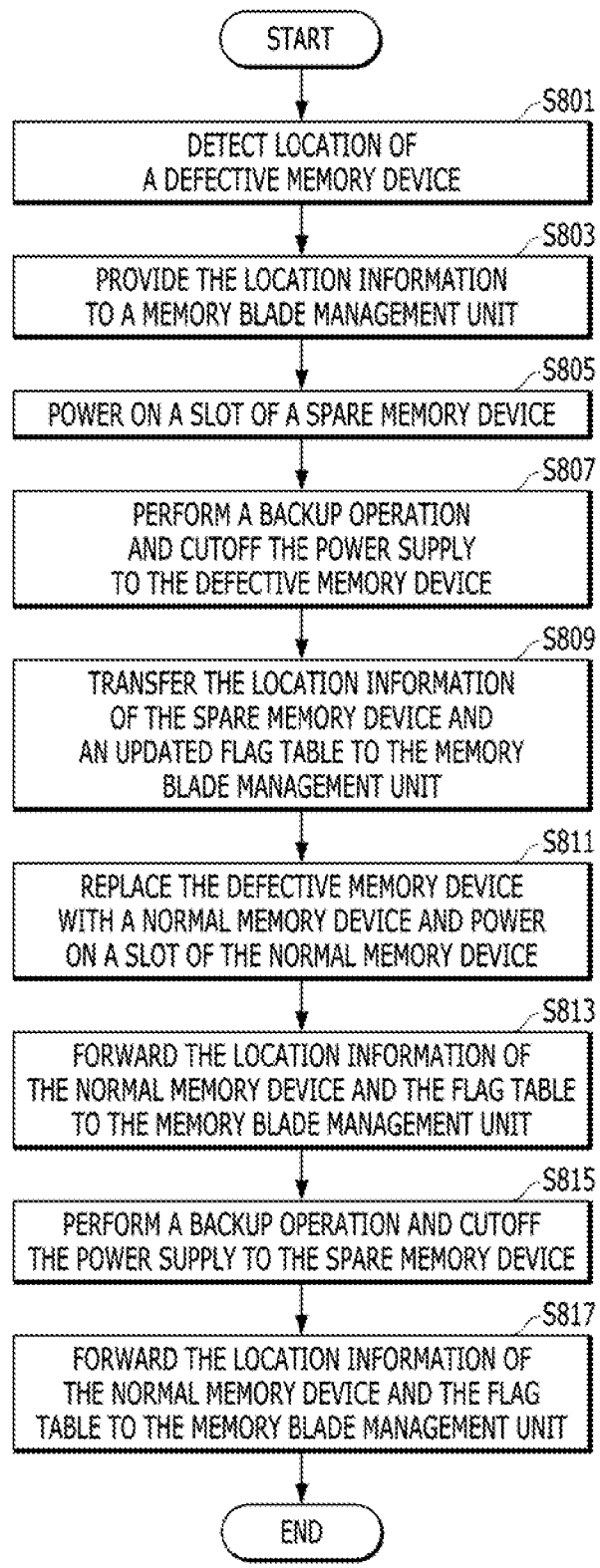
FIG. 8 is a flowchart schematically illustrating an operation of a computing device in accordance with an embodiment of the present disclosure.

FIG. 8 is a flowchart schematically illustrating an operation of a computing device. Hereinafter, it is assumed that a flag has a value of one (1) when a corresponding memory device is available and the flag has a value of zero (0) when the corresponding memory device is not available. The operation of the computing device shown in FIG. 8 will be described with reference to FIGS. 6 and 7.

At step S801, the monitor 610 may detect a location of a first DIMM slot on which a defective memory device is mounted, and may store therein location information of the defective memory device. Although not illustrated, the monitor 610 may detect availabilities of the spare memory devices 695 by referring to a flag table. Further, an LED indicator provided at the first DIMM slot on which the defective memory device is mounted may turn on red light.

At step S803, the monitor 610 of the controller 670 may provide the location information indicating the location of the first DIMM slot to the memory blade management unit 750. Also, the controller 670 may provide the flag table to the memory blade management unit 750. The memory blade management unit 750 may update a global map based on the provided flag table. When a flag corresponding to a first spare memory device 695 has a value of one (1), the memory blade management unit 750 may control the memory blade 600 such that a request to be provided to the defective memory device is transferred to the first spare memory device 695.

At step S805, the power management unit 620 may power on a second DIMM slot on which the first spare memory device 695 is mounted under the control of the memory blade management unit 750.

At step S807, when the second DIMM slot of the first spare memory devices 695 is powered on, the processor 630 may control the defective memory device and the first spare memory device 695 to perform a backup operation to copy data from the defective memory device into the first spare memory device 695. During the backup operation, the LED indicator provided at the first DIMM slot may flash red light while an LED indicator provided at the second DIMM slot may flash blue light. After completion of the backup operation, the power management unit 620 may cut off the power supply to the defective memory device. Further, the monitor 610 may update the flag table such that the flag corresponding to the first spare memory device 695 has a value of zero (0). Also, the LED indicator provided at the second DIMM slot may turn on blue light.

At step S809, the controller 670 may transfer location information of the first spare memory device 695 and the updated flag table to the memory blade management unit 750. The memory blade management unit 750 may update the global map based on the location information of the first spare memory device 695 and the updated flag table. Therefore, the memory blade management unit 750 may forward a read request or write request generated by an external device (e.g., a host) to the first spare memory device 695. In detail, the processor 630 may control the first spare memory device 695 to perform an operation in respond to the read request or write request instead of the defective memory device. Also, the memory blade management unit 750 may identify that the first spare memory devices 695 in a corresponding memory blade is not available based on the global map.

At step S811, the defective memory device may be repaired. For example, the defective memory device may be replaced with a normal memory device in the same memory blade. When the defective memory device is replaced with the normal memory device, the power management unit 620 may automatically power on a DIMM slot on which the normal memory device is mounted. Although not illustrated, the monitor 610 may update the flag table for a flag corresponding to the normal memory device to have a value of one (1).

At step S813, the controller 670 may forward location information of the normal memory device and the flag table to the memory blade management unit 750. The memory blade management unit 750 may update the global map based on the location information of the normal memory device and the flag table. Then, the memory blade management unit 750 may control the normal memory device and the first spare memory device 695 such that the read request and write request generated by the external device is provided to the normal memory device instead of the first spare memory device 695.

In another embodiment, although not illustrated, the memory blade management unit 750 may designate the normal memory device as a new spare memory device. Therefore, the first spare memory device 695, rather than the normal memory device, may operate instead of the defective memory device since the normal memory device is used as a spare memory device.

At step S815, under the control of the memory blade management unit 750, the processor 630 may control the first spare memory device 695 and the normal memory device to move data from the first spare memory device 695 to the normal memory device. That is, the processor 630 may control the first spare memory devices 695 and the normal memory device to perform a backup operation of copying data of the first spare memory device 695 into the new memory device. During the backup operation, the LED indicator of the second DIMM slot, on which the first spare memory devices 695 is mounted, may flash red light, and an LED indicator of a third DIMM slot, on which the normal memory device is mounted, may flash blue light. Upon completion of the backup operation, the power management unit 620 may cut off the power supply to the first spare memory device 695. The LED indicator of the third DIMM slot may turn on green light. The monitor 610 may update the flag table such that the flag corresponding to the first spare memory device 695 has a value of one (1) and the flag corresponding to the normal memory device has a value of zero (0).

At step S817, the controller 670 may forward the location information of the normal memory device and the flag table to the memory blade management unit 750. The memory blade management unit 750 may update the global map based on the location information of the normal memory device and the flag table. Therefore, the memory blade management unit 750 may forward the read request or write request generated by the external device (e.g., the host) to the normal memory device.

Through steps S801 to S817, the computing device 700 may secure data stored in the defective memory device and may keep data normal in a system. Further, even when a defective memory device occurs, the defective memory device may be replaced with a normal memory device without giving a burden to the system.

Figure 9:
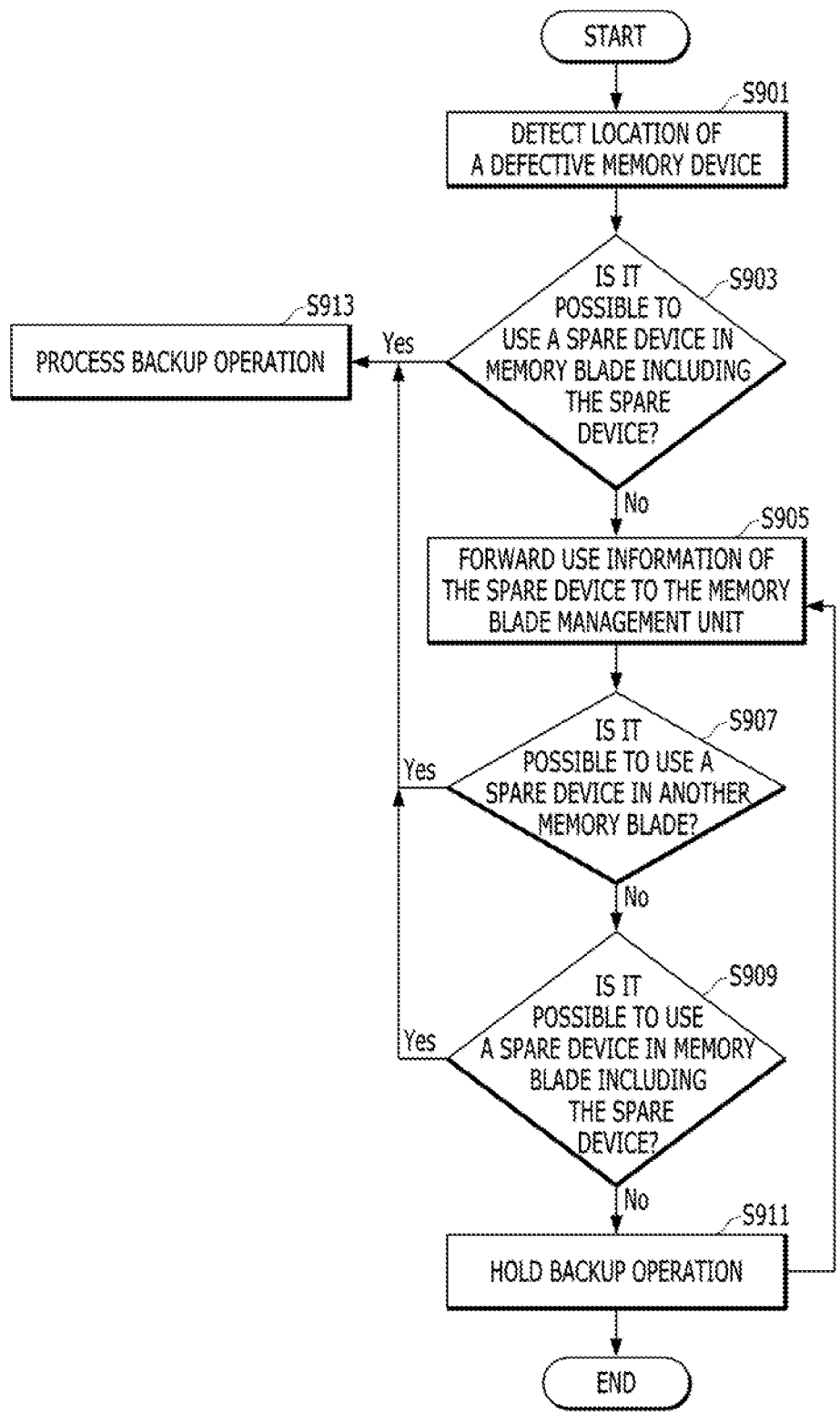
FIG. 9 is a flowchart schematically illustrating an operation of a computing device in accordance with an embodiment of the present disclosure.

FIG. 9 is a flowchart schematically illustrating an operation of a computing device according to an embodiment of the present disclosure. FIG. 9 shows an operation of the computing device 700 shown in FIG. 7. The computing device 700 uses a second spare memory device of the second memory blade 600B when spare memory devices of the first memory blade 600A are already taken for use or are not available. Each of the first and second memory blades 600A and 600B has the same structure as the memory blade 600 shown in FIG. 6.

At step S901, a monitor in the first controller 670A of the first memory blade 600A may detect a location of a DIMM slot on which a defective memory device is mounted, and may store therein location information of the defective memory device.

At step S903, the monitor may identify the availability of a first spare memory device 695A of the first memory blade 600A by referring to a flag table.

When the first spare memory device 695A is available ('YES' at step S903), that is, when a flag corresponding to the first spare memory device 695A has a value of one (1), a processor in the first controller 670A of the first memory blade 600A may control the first spare memory device 695A to perform a backup operation for the defective memory device at step S913.

When the first spare memory device 695A is not available ('NO' at step S903), that is, when the flag corresponding to the first spare memory device 695A has a value of zero (0), the first controller 670A may forward use information of the first spare memory device 695A, that is, the flag table including the flag to the memory blade management unit 750 at step S905. The memory blade management unit 750 may update the global map according to the flag table.

At step S907, the memory blade management unit 750 may search for a spare memory device for backing up data of the defective memory device included in the first memory blade 600A instead of the first spare memory device 695A based on the global map.

When a second spare memory device 695B of the second memory blade 600B is available ('YES' at step S907), that is, when a flag corresponding to the second spare memory device 695B has a value of one (1), the memory blade management unit 750 may control the second spare memory device 695B to perform a backup operation for data stored in the defective memory device of the first memory blade 600A instead of the first spare memory device 695A at step S913. In detail, the first processor in the first controller 670A of the first memory blade 600A may control the defective memory device to copy the data stored in the defective memory device of the first memory blade 600A, and a first node controller in the first controller 670A of the first memory blade 600A may forward the copied data to the memory blade management unit 750. Further, a second node controller in the second controller 670B of the second memory blade 600B may receive the copied data from the memory blade management unit 750, and a second processor in the second controller 670B of the second memory blade 600B may control the second spare memory device 695B to store the copied data in the second spare memory device 695B.

When the second spare memory device 695B is not available ('NO' at step S907), that is, when the flag corresponding to the second spare memory device 695B has a value of zero (0), the memory blade management unit 750 may identify again the availability of the first spare memory device 695A from the global map at step S909. That is, the memory blade management unit 750 may scan again the flag corresponding to the first spare memory device 695A of the first memory blade 600A.

When the first spare memory device 695A is available ('YES' at step S909), that is, when the flag corresponding to the first spare memory device 695A has a value of one (1), the processor of the first memory blade 600A may control the first spare memory device 695A to perform the backup operation for the defective memory device at step S913.

When the first spare memory device 695A is not available ('NO' at step S909), that is, when the flag corresponding to the first spare memory device 695A has a value of zero (0), the memory blade management unit 750 may control the first memory blade 600A to suspend the corresponding backup operation for a while at step S911. Further, the computing device 700 may repeat steps S905 to S911 until an available spare memory device is detected.

FIGS. 10A to 10D are flowcharts schematically illustrating operations of a memory blade according to embodiments of the present disclosure. In particular, FIGS. 10A to 10D show operations of a computing device to detect a defective memory device by checking a status of each of a plurality of memory devices in a memory blade. The operations of the computing device shown in FIGS. 10A to 10D will be described with reference to FIGS. 6 and 7.

Figure 10A:
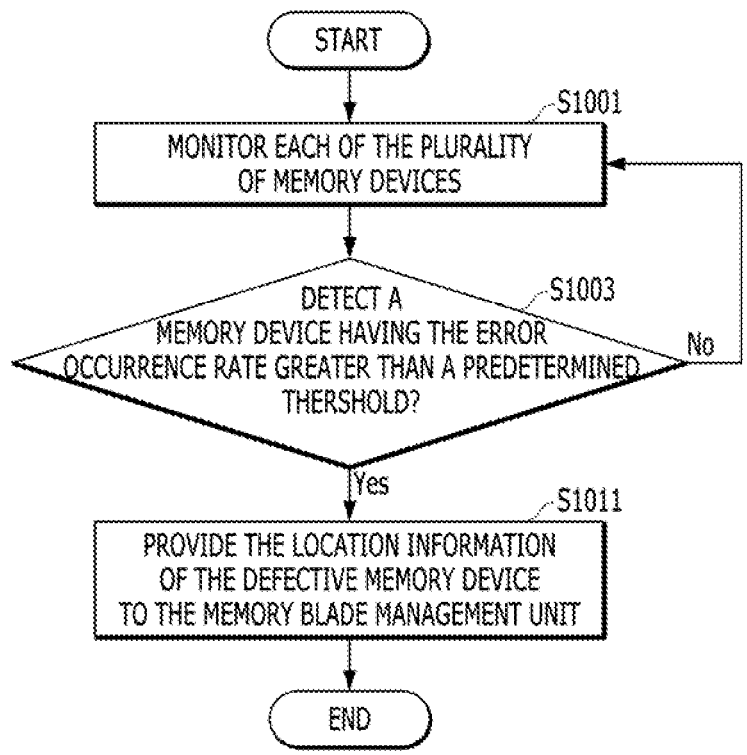
FIG. 10A is a flowchart illustrating an operation of a memory blade for detecting a defective memory device based on a first parameter in accordance with an embodiment of the present disclosure.

FIG. 10A is a flowchart illustrating an operation of the memory blade 600 of FIG. 6 for detecting a defective memory device based on a first parameter. The first parameter may represent an error occurrence rate or error occurrence frequency of a memory device in the memory blade 600.

At step S1001, the monitor 610 of the memory blade 600 may periodically monitor the plurality of memory devices 691 to 69N. For example, the monitor 610 may periodically check whether there occurs an error in each of the plurality of memory devices 691 to 69N.

At step S1003, the monitor 610 may detect a memory device, which has an error occurrence rate that is greater than a first predetermined threshold value, as a defective memory device, among the plurality of memory devices 691 to 69N.

When there is no memory device having an error occurrence rate that is greater than the first predetermined threshold value among the plurality of memory devices 691 to 69N ('NO' at step S1003), the monitor 610 may repeat steps S1001 and S1003.

When there is the memory device having the error occurrence rate that is greater than the first predetermined threshold value among the plurality of memory devices 691 to 69N ('YES' at step S1003), the monitor 610 may store location information of the detected defective memory device.

At step S1011, the monitor 610 may provide the location information of the defective memory device to the memory blade management unit 750 shown in FIG. 7.

Figure 10B:
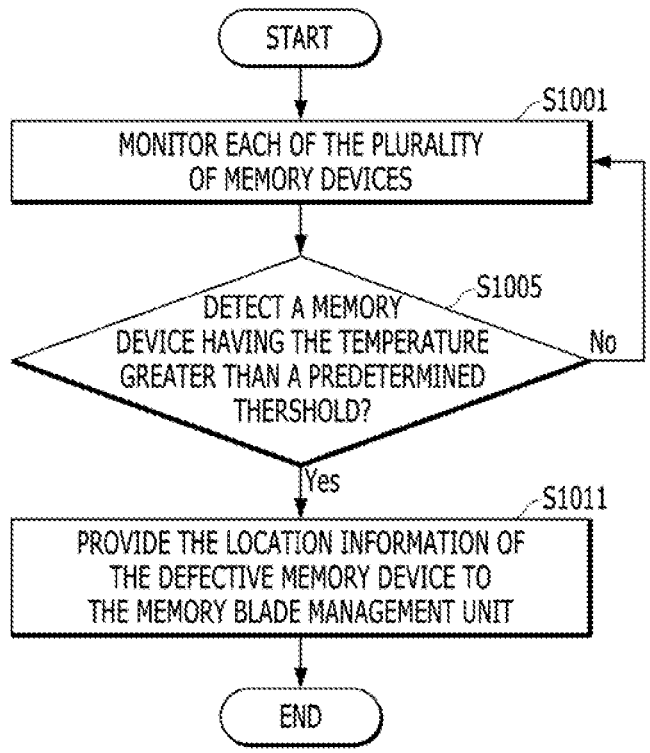
FIG. 10B is a flowchart illustrating an operation of a memory blade for detecting a defective memory device based on a second parameter in accordance with an embodiment of the present disclosure.

FIG. 10B is a flowchart illustrating an operation of the memory blade 600 for detecting a defective memory device based on a second parameter. The second parameter may represent a temperature of a memory device in the memory blade 600.

At step S1001, the monitor 610 of the memory blade 600 may periodically monitor the plurality of memory devices 691 to 69N. For example, the monitor 610 may periodically check a temperature in each of the plurality of memory devices 691 to 69N.

At step S1005, the monitor 610 may detect a memory device, which has a temperature that is greater than a second predetermined threshold value, as a defective memory device, among the plurality of memory devices 691 to 69N.

When there is no memory device having a temperature that is greater than the second predetermined threshold value among the plurality of memory devices 691 to 69N ('NO' at step S1005), the monitor 610 may repeat steps S1001 and S1005.

When there is the memory device having the temperature that is greater than the second predetermined threshold value among the plurality of memory devices 691 to 69N ('YES' at step S1005), the monitor 610 may store location information of the detected defective memory device.

At step S1011, the monitor 610 may provide the location information of the defective memory device to the memory blade management unit 750 shown in FIG. 7.

Figure 10C:
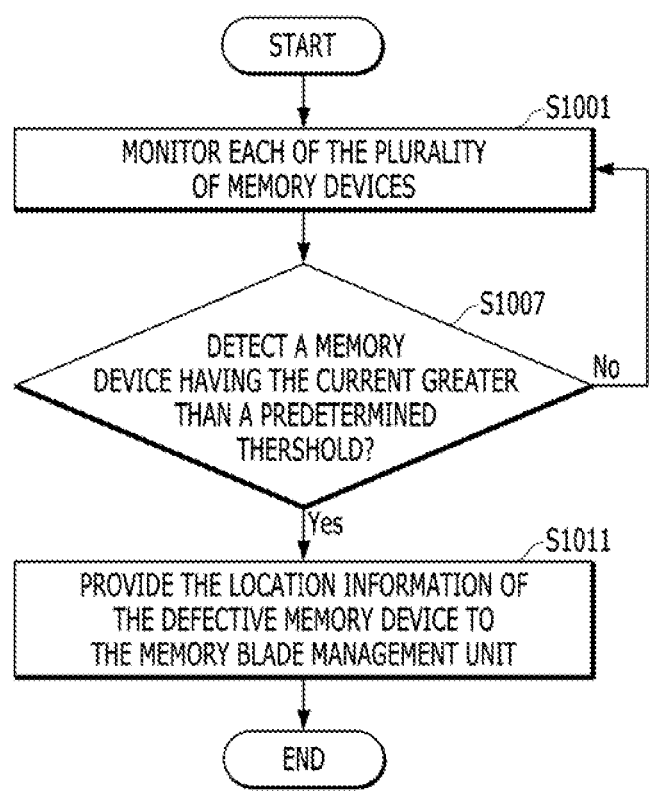
FIG. 10C is a flowchart illustrating an operation of a memory blade for detecting a defective memory device based on a third parameter in accordance with an embodiment of the present disclosure.

FIG. 10C is a flowchart illustrating an operation of the memory blade 600 for detecting a defective memory device based on a third parameter. The third parameter may represent a current flowing in a memory device in the memory blade 600.

At step S1001, the monitor 610 of the memory blade 600 may periodically monitor the plurality of memory devices 691 to 69N. For example, the monitor 610 may periodically identify a current flowing in each of the plurality of memory devices 691 to 69N.

At step S1007, the monitor 610 may detect a memory device, which has a current that is greater than a third predetermined threshold value, as a defective memory device, among the plurality of memory devices 691 to 69N.

When there is no memory device having a current that is greater than the third predetermined threshold value among the plurality of memory devices 691 to 69N ('NO' at step S1007), the monitor 610 may repeat steps S1001 and S1007.

When there is the memory device having the current that is greater than the third predetermined threshold value among the plurality of memory devices 691 to 69N ('YES' at step S1007), the monitor 610 may store location information of the detected defective memory device.

At step S1011, the monitor 610 may provide the location information of the defective memory device to the memory blade management unit 750 shown in FIG. 7.

Figure 10D:
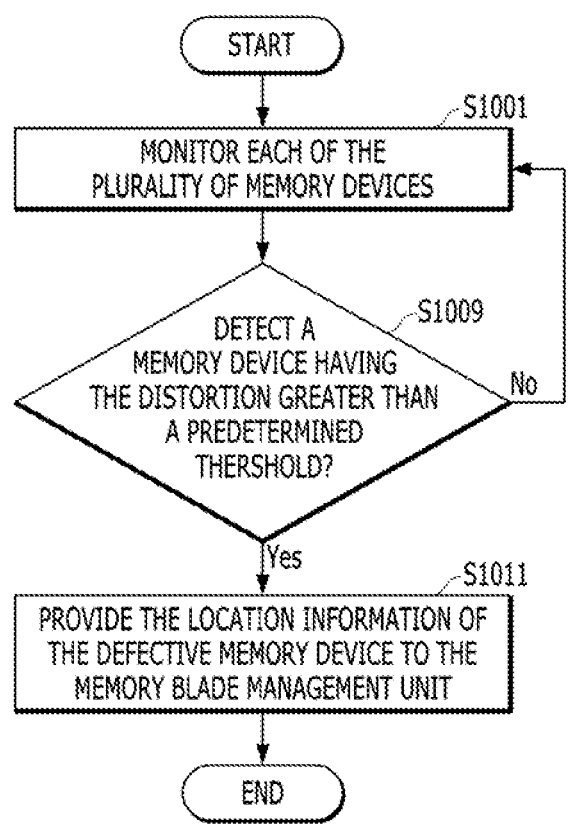
FIG. 10D is a flowchart illustrating an operation of a memory blade for detecting a defective memory device based on a fourth parameter in accordance with an embodiment of the present disclosure.

FIG. 10D is a flowchart illustrating an operation of the memory blade 600 for detecting a defective memory device based on a fourth parameter. The fourth parameter may represent a distortion of a memory device in the memory blade 600. The distortion may include duty cycle distortion, signal distortion, cell array distortion, and so on.

At step S1001, the monitor 610 of the memory blade 600 may periodically monitor the plurality of memory devices 691 to 69N. For example, the monitor 610 may periodically check a distortion in each of the plurality of memory devices 691 to 69N.

At step S1009, the monitor 610 may detect a memory device, which has a distortion that is greater than a fourth predetermined threshold value, as a defective memory device, among the plurality of memory devices 691 to 69N.

When there is no memory device having a distortion that is greater than the fourth predetermined threshold value among the plurality of memory devices 691 to 69N ('NO' at step S1009), the monitor 610 may repeat steps S1001 and S1009.

When there is the memory device having the distortion that is greater than the fourth predetermined threshold value among the plurality of memory devices 691 to 69N ('YES' at step S1009), the monitor 610 may store location information of the detected defective memory device.

At step S1011, the monitor 610 may provide the location information of the defective memory device to the memory blade management unit 750 shown in FIG. 7.

Figure 11:
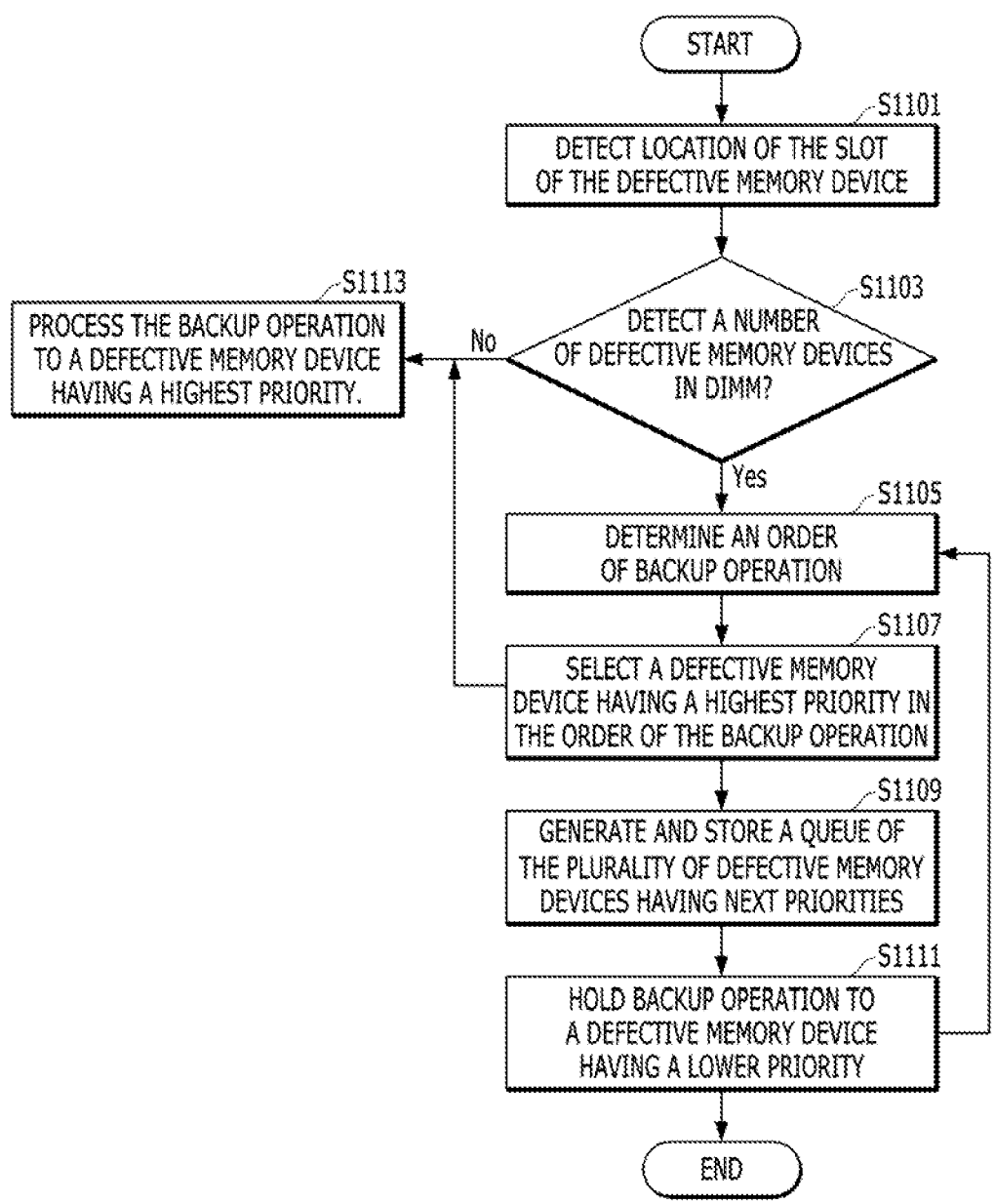
FIG. 11 is a flowchart schematically illustrating an operation of a memory blade in accordance with an embodiment of the present disclosure.

FIG. 11 is a flowchart schematically illustrating an operation of a memory blade according to an embodiment of the present disclosure. FIG. 11 shows an operation of the memory blade 600 of FIG. 6 for sequentially performing backup operations for a plurality of defective memory devices by setting priorities of the backup operations when the plurality of defective memory devices are detected in the memory blade 600.

At step S1101, the monitor 610 may detect a location of a DIMM slot on which a defective memory device is mounted, and may store location information of the defective memory device.

At step S1103, it is determined whether the monitor 610 detects a number of defective memory devices or not.

When an error occurs at a single DIMM slot ('NO' at step S1103), the memory blade 600 may perform a backup operation for a defective memory device on the single DIMM slot at step S1113.

When errors occur at a plurality of DIMM slots ('Yes' at step S1103), at the step S1105, the monitor 610 may determine a processing order of backup operations to be performed on the plurality of defective memory devices based on the first to fourth parameters described with reference to FIGS. 10A to 10D. The monitor 610 may store the determined processing order. For example, the monitor 610 may set the processing order of the backup operations such that a defective memory device having an error occurrence rate that is greater than the first predetermined threshold value has a higher priority than a defective memory device having a current that is greater than the third predetermined threshold value.

At step S1107, the processor 630 may select a defective memory device having a highest priority in the processing order of the backup operations and a corresponding spare memory device 695 to perform a backup operation for the defective memory device based on the processing order of the backup operations.

At step S1109, the monitor 610 may generate and store a queue of the plurality of defective memory devices having next priorities. For example, a defective memory device having an error occurrence rate that is greater than the first predetermined threshold value, a defective memory device having a current that is greater than the third predetermined threshold value, and a defective memory device having a temperature that is greater than the second predetermined threshold value may be sequentially included in the queue.

At step S1111, the memory blade management unit 750 shown in FIG. 7 may control the memory blade 600 not to perform a backup operation to a defective memory device having a lower priority until a backup operation is completed to a defective memory device having a higher priority in the processing order of the backup operations. After the backup operation is completed to the defective memory device having the higher priority in the processing order of the backup operations, the computing device 700 may repeat steps S1105 to S1111 for the other defective memory devices having lower priorities.

Figure 12:
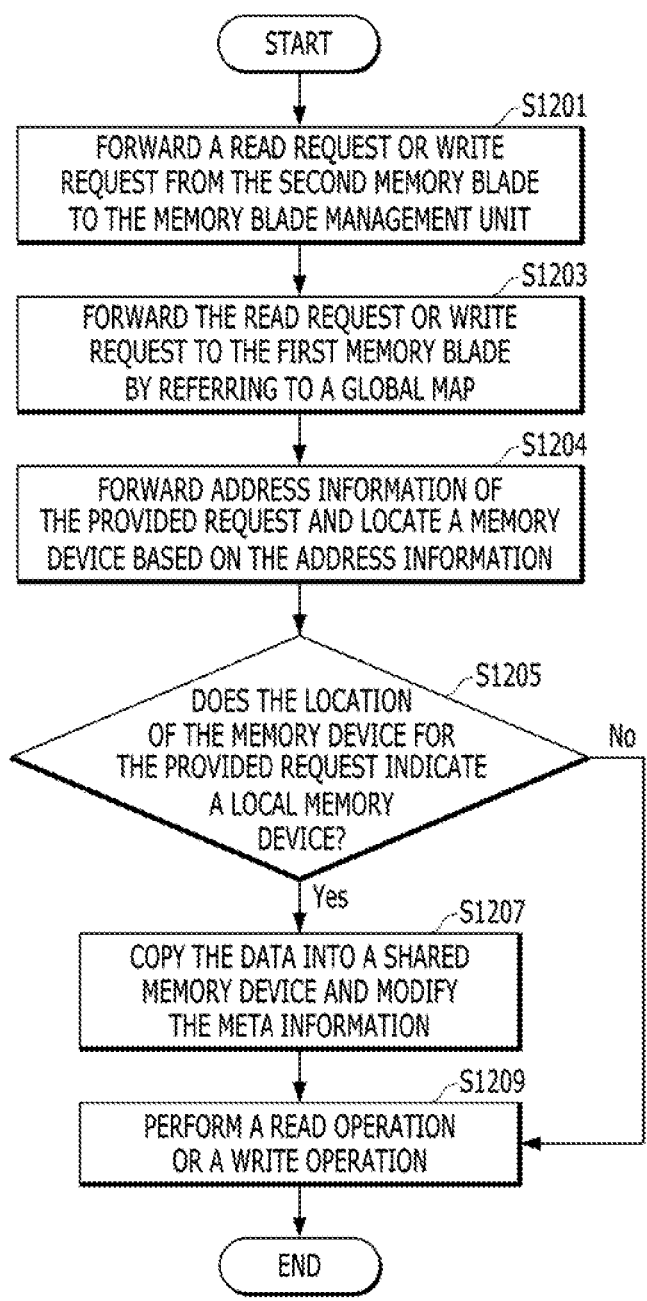
FIG. 12 is a flowchart illustrating an operation of a computing device in accordance with an embodiment of the present disclosure.

FIG. 12 is a flowchart illustrating an operation of a computing device in accordance with an embodiment of the present disclosure. FIG. 12 shows an operation of the plurality of memory blades 600A to 600M shown in FIG. 7 for communicating with one another through the memory blade management unit 750. Hereinafter, the operation of the computing device shown in FIG. 12 will be described with the first memory blade 600A and the second memory blade 600B shown in FIG. 7. It is assumed that the second controller 670B of the second memory blade 600B provides a read request or write request to the first memory blade 600A.

At step S1201, a second node controller included in the second controller 670B may forward the read request or write request to the memory blade management unit 750.

At step S1203, the memory blade management unit 750 may forward the read request or write request, which is provided from the second node controller of the second controller 670B, to a first node controller included in the first controller 670A by referring to a global map.

At step S1204, the first node controller of the first controller 670A may forward address information of the provided request to a first address router included in the first controller 670A. Further, the first address router of the first controller 670A may identify the address information based on meta information of data for the provided request, and may locate a memory device in the first memory blade 600A. That is, the first address router of the first controller 670A may set a data path.

At step S1205, it is determined whether the location of the memory device for the provided request indicates a local memory device in the first memory blade 600A or not.

When the location of the memory device for the provided request indicates the local memory device ('YES' at step S1205), a first processor of the first controller 670A may control the local memory device to copy the data for the provided request, which is stored in the local memory device, into the first shared memory device 685A at step S1207. The first address router of the first controller 670A may modify the meta information to indicate that the data for the provided request is copied from the local memory device to the first shared memory device 685A.

At step S1209, the first memory blade 600A may perform a read operation or a write operation in response to the provided request.

For example, when the provided request is the read request, the first processor may control the local memory device to read data in response to the read request. The read data may be forwarded to the second memory blade 600B through the first node controller and the memory blade management unit 750.

For example, when the provided request is the write request, the first processor 630 may control the first shared memory device 685A to perform a write operation on the data, which is copied into the first shared memory device 685A at step S1207. The first address router of the first controller 670A may modify the meta information to indicate that the data stored in the local memory device is different from data stored in the first shared memory device 685A that is updated by the write operation.

When the location of the memory device for the provided request indicates the first shared memory device 685A ('NO' at step S1205), at step S1209, the first memory blade 600A may perform the read operation or the write operation with the first shared memory device 685A in response to the provided request, as described above.

Although not illustrated, data stored in the shared memory devices 685 may be managed using queues, as described with reference to FIG. 6. When the number of the queues is greater than a threshold value, the data stored in the shared memory devices 685 may be moved to a local memory device. For example, a first processor in the first memory blade 600A may copy data stored in a local memory device into the first shared memory devices 685A in response to a request provided from the second memory blade 600B. When the request provided from the second memory blade 600B is repeated, the first shared memory devices 685A may be full of copied data. Since a first address router in the first memory blade 600A may manage the data stored in the first shared memory devices 685A using the queues, when the first shared memory devices 685A may be full of copied data and thus the number of the queues is greater than the threshold value, the first address router in the first memory blade 600A may forward information of the queues to the first processor. The first processor may control the local memory device and the first shared memory devices 685A to copy data from the first shared memory devices 685A into the local memory device by referring to meta information of the data.

Figure 13:
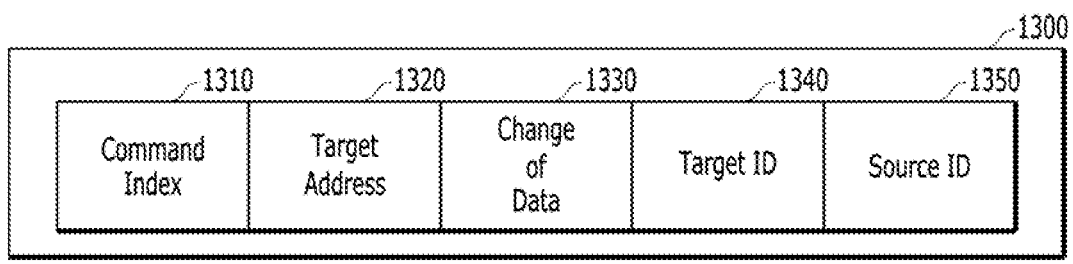
FIG. 13 is a diagram schematically illustrating a structure of meta information in accordance with an embodiment of the present disclosure.

FIG. 13 is a diagram schematically illustrating a structure of meta information 1700 in accordance with an embodiment of the present disclosure.

FIG. 13 exemplifies the meta information 1700 that includes various fields such as a command index field 1310, a target address field 1320, a change of data field 1330, a target ID field 1340, a source ID field 1350, and so forth. The command index field 1310 may provide a reception order of requests provided from other memory blades, and the target address field 1320 may provide a location of a memory device for the provided request. The change of data field 1330 may provide whether data can be changed in response to the provided request, the target ID field 1340 may provide ID information of a memory blade that is a destination of the provided request, and the source ID field 1350 may provide ID information of a memory blade that is a source of the provided request.

For example, when the second memory blade 600B provides a read request for read data to the first memory blade 600A, the read data being to be changed, the first memory blade 600A may generate the meta information 1700 for the read data by storing order information of the read request in the command index field 130, information indicating that the read data may be changed in the change of data field 1330, and an ID of the second memory blade 600B in the source ID field 1750. The requested read data may be copied into the shared memory devices 685A, and the address router of the first memory blade 600A may update an address table included in the shared memory devices 685A. When the provided request from the second memory blade 600B does not require change of corresponding data, the read data may not be copied into the shared memory devices 685A. When the second memory blade 600B provides a read request to the same memory device, the first memory blade 600A may select the shared memory devices 685A as a memory device corresponding to the read request.

In accordance with an embodiment of the present disclosure, power domains of shared memory devices included in a plurality of memory blades may be separated from one another. Therefore, the connection among a node controller, an address router, and a shared memory device may be maintained even when an error occurs in memory devices other than the controller and the shared memory device, which prevents an error from occurring in the whole system. Further, an error occurring in the whole system may be prevented even though errors occur in a part of the plurality of memory blades.

While the present invention has been described with respect to the specific embodiments, it will be apparent to those skilled in the art that various changes and modifications may be made without departing from the spirit and scope of the invention as defined in the following claims.

What is claimed is:

1. A computing device comprising:
a plurality of memory blades; and
a compute blade controlling each of the plurality of memory blades based on a global map that includes information on each of the plurality of memory blades,
wherein each of the plurality of memory blades includes:
a plurality of memory devices including a spare memory device; and a controller controlling the plurality of memory devices, and wherein the controller executes steps of:
storing a flag table indicating location information and availability of each of the plurality of memory devices; and
in response to detecting a defective memory device among the plurality of memory devices, updating the location information of the defective memory device in the flag table and forwarding the flag table to the computer blade, wherein the compute blade selects a spare memory device included in a same or different memory blade as the defective memory device, based on the flag table, wherein the controller performs a first backup operation including:
providing a power to a slot of the selected spare memory device;
copying data from the defective memory device into the selected spare memory device; and
shutting down the power to a slot of the defective memory device, and wherein the controller updates the flag table by changing a flag corresponding to the selected spare memory device to a value indicating that the selected spare memory device is unavailable after the first backup operation is completed, and forwards the updated flag table to the compute blade.

2. The computing device of claim 1, wherein the controller controls the power to be supplied to a slot of a normal memory device after the defective memory device is replaced with the normal memory device, the normal memory device being included in a plurality of memory devices of a target memory blade.

3. The computing device of claim 2,
wherein the controller updates the flag table by changing a flag corresponding to the normal memory device to a value indicating that the normal memory device is available, and forwards location information of the normal memory device and the updated flag table to the compute blade, and
wherein the compute blade controls the target memory blade to use the normal memory device instead of the spare memory device in the target memory blade.

4. The computing device of claim 3, wherein the processor controls the normal memory device and the spare memory device to perform a second backup operation of copying data from the spare memory device into the normal memory device.

5. The computing device of claim 4, wherein the controller shuts down the power to the slot of the spare memory device after the second backup operation is completed.

6. The computing device of claim 5,
wherein the controller updates the flag table by changing the flag corresponding to the spare memory device to a value indicating that the spare memory device is available after the second backup operation is completed, and forwards the updated flag table to the compute blade, and
wherein the compute blade forwards a read request or a write request to the normal memory device.

7. The computing device of claim 1, wherein the compute blade designates, after the defective memory device is replaced with a normal memory device, the normal memory device as a new spare memory device, the normal memory device being included in a plurality of memory devices of a target memory blade.

8. A computing device comprising:
a plurality of memory blades; and
a compute blade controlling each of the plurality of memory blades based on a global map that includes information on each of the plurality of memory blades,
wherein each of the plurality of memory blades includes:
a plurality of memory devices; and
a controller controlling the plurality of memory devices, and
wherein the controller executes steps of:
periodically checking a status of each of the plurality of memory devices;
detecting a defective memory device among the plurality of memory devices; and
updating a flag table indicating location information and availability of each of the plurality of memory devices,
wherein the controller detects first to fourth parameters of each of the plurality of memory devices, and determines a memory device, which has one or more of the first to fourth parameters that are respectively greater than corresponding threshold values, as the defective memory device, and
wherein the first parameter is an error occurrence rate of a memory device, the second parameter is a temperature of the memory device, the third parameter is a current flowing through the memory device, and the fourth parameter is a distortion of the memory device.

9. The computing device of claim 8, wherein the controller sets, when a plurality of defective memory devices are detected among the plurality of memory devices, an operation order of backup operations for the plurality of defective memory devices based on the first to fourth parameters of the plurality of defective memory devices.

10. The computing device of claim 9, wherein the controller comprises a processor controlling corresponding memory devices to sequentially perform the backup operations for the plurality of defective memory devices according to the operation order.

11. A computing device comprising:
a plurality of memory blades; and
a compute blade controlling each of the plurality of memory blades based on a global map that includes information on each of the plurality of memory blades,
wherein each of the plurality of memory blades includes:
a plurality of memory devices including a shared memory device and a local memory device; and
a controller controlling the plurality of memory devices, and
wherein the controller executes steps of:
storing data for a request into the shared memory device, when the request is received from other memory blades among the plurality of memory blades;
moving data selected based on meta information of the data stored in the shared memory device to the local memory device, when the shared memory device is full;
controlling a provision of a power to the shared memory device and the local memory device; and
shutting down the power of the local memory device and providing the power of the shared memory device, when a defect is detected in the local memory device,
wherein the meta information of the data for the request from the other memory blade includes order information of the request, address information of a target memory device for the request, information indicating change of the data for the request, information of a target memory blade of the request, and information of a source memory blade of the request, the source memory blade corresponding to the other memory blade.

12. The computing device of claim 11, wherein the compute blade forwards a request provided from the other memory blade to the target memory blade based on the global map, the target memory blade including the plurality of memory devices.

13. The computing device of claim 12, wherein the controller comprises a processor controlling, when the address information of the target memory device for the request indicates the shared memory device, the shared memory device to perform a read operation or a write operation for data read-requested or write-requested from the other memory blade.

14. The computing device of claim 12, wherein the controller comprises a processor controlling, when the address information of the target memory device for the request indicates the local memory device and the request is a write request, the shared memory device and the local memory device to copy write-requested data from the local memory device into the shared memory device and perform a write operation for the write-requested data copied in the shared memory device.

15. The computing device of claim 14, wherein the controller changes meta information of the write-requested data.

16. The computing device of claim 12, wherein the controller comprises a processor controlling, when the address information of the target memory device for the request indicates the local memory device and the request is a read request, the shared memory device and the local memory device to copy read-requested data from the local memory device into the shared memory device and perform a read operation for the read-requested data.

17. The computing device of claim 16, wherein the processor controls, when a data queue stored in the shared memory device is greater than a predetermined threshold value, the shared memory device to move the data stored in the shared memory device to the local memory device based on the meta information of the data.

* * * * *